(12) United States Patent
Suzuki

(10) Patent No.: US 7,598,205 B2
(45) Date of Patent: Oct. 6, 2009

(54) EXHAUST GAS PURIFYING CATALYST

(75) Inventor: Hiromasa Suzuki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 240 days.

(21) Appl. No.: 11/884,682

(22) PCT Filed: Jan. 27, 2006

(86) PCT No.: PCT/JP2006/001820

§ 371 (c)(1),
(2), (4) Date: Aug. 20, 2007

(87) PCT Pub. No.: WO2006/087920

PCT Pub. Date: Aug. 24, 2006

(65) Prior Publication Data

US 2009/0163358 A1    Jun. 25, 2009

(30) Foreign Application Priority Data

Feb. 18, 2005    (JP) .............................. 2005-042681

(51) Int. Cl.
*B01J 23/00*    (2006.01)
*B01J 23/38*    (2006.01)

(52) U.S. Cl. ..................... 502/325; 502/304; 502/327; 502/332; 502/333; 502/334; 502/349; 502/350; 502/351; 502/353; 502/355

(58) Field of Classification Search ................. 502/304, 502/325, 327, 332, 333, 334, 349, 350, 351, 502/353, 355
See application file for complete search history.

(56) References Cited

U.S. PATENT DOCUMENTS

| 4,937,058 | A  | 6/1990 | Dupin et al. |
| 5,120,695 | A  | 6/1992 | Blumrich |
| 6,022,826 | A  | 2/2000 | Deeba |
| 6,350,421 | B1 | 2/2002 | Strehlau |
| 6,616,904 | B1 | 9/2003 | Becue |

FOREIGN PATENT DOCUMENTS

| EP | 0 714 692 | 6/1996 |
| GB | 1 384 248 | 2/1975 |
| JP | 61-20342 | 5/1986 |
| JP | 2-20561 | 5/1990 |
| JP | 5-81521 | 11/1993 |
| JP | 8-15554 | 2/1996 |
| JP | 9-86928 | 3/1997 |

OTHER PUBLICATIONS

International Search Report.
Written Opinion of the International Searching Authority, dated May 2007.

*Primary Examiner*—Elizabeth D Wood
(74) *Attorney, Agent, or Firm*—Finnegan, Henderson, Farabow, Garrett & Dunner, LLP

(57) ABSTRACT

In a three-way catalyst for purifying exhaust gases from internal combustion engines, scattering of bismuth components can be suppressed by employing a Bi—Ti composite oxide at a predetermined ratio. Accordingly, the effect of suppressing hydrogen sulfide emissions can be retained for a long time. This catalyst comprises a support substrate, and a catalyst layer formed on the support substrate and including a noble metal, a porous oxide, and a Bi—Ti composite oxide, and satisfies $0.3 \leq R \leq 1.5$, where R is the molar ratio of the Bi content to the Ti content per unit volume of the support substrate.

4 Claims, 2 Drawing Sheets

US 7,598,205 B2

EXHAUST GAS PURIFYING CATALYST

TECHNICAL FIELD

The present invention relates to a catalyst for purifying exhaust gases from internal combustion engines such as automobile engines, and more particularly to an exhaust gas purifying catalyst capable of suppressing hydrogen sulfide ($H_2S$) emissions.

BACKGROUND ART

Nowadays, a three-way catalyst is widely used as a catalyst for purifying $NO_x$ (nitrogen oxides), CO carbon monoxide and HC (hydrocarbons) in exhaust gases from automobiles or the like. The three-way catalyst comprises a porous oxide supports such as alumina, ceria, zirconia and a ceria-zirconia solid solution, and a noble metal such as platinum (Pt), rhodium (Rh) and palladium (Pd) loaded on the supports, and simultaneously purifies HC and CO by oxidation and $NO_x$ by reduction. Since these reactions proceed most efficiently in an atmosphere including approximately equivalent amounts of oxidizing components and reducing components, in an automobile to which a three-way catalyst is installed, the air/fuel ratio is controlled so that an air-fuel mixture is burned at or near the theoretical air/fuel ratio, i.e., the stoichiometric point (A/F=about 14.6±0.2).

The three-way catalyst, however, has a problem that when the exhaust gas atmosphere becomes reductive, sulfur oxides in the exhaust gases are reduced into and emitted as $H_2S$. Japanese Examined Patent Publication (KOUKOKU) No. H08-015,554 discloses the use of nickel or copper oxides as components of a three-way catalyst. The nickel or copper oxides oxidize $SO_2$ into $SO_3$ or $SO_4$ in an oxidizing atmosphere and store sulfur components as sulfides such as $Ni_2S_3$ in a reducing atmosphere, whereby $H_2S$ emissions can be suppressed.

However, since nickel or copper is an environmentally hazardous substance, the use of nitrogen or copper in a catalyst for purifying exhaust gases from automobiles is getting inhibited. Therefore, consideration is given to the use of bismuth oxides, which exhibit a similar effect of suppressing $H_2S$ emissions to those of nickel or copper oxides. A Bi-containing catalyst, however, has a problem that bismuth components scatter at elevated temperatures and the effect of suppressing $H_2S$ emissions is not retained for a long time.

By the way, Japanese Examined Patent Publications (KOUKOKU) Nos. H02-020,561, H05-081,521, and S61-020,342 disclose Bi-containing catalysts. These catalysts, however, aim to oxidize $H_2S$ in oxidizing atmospheres. Therefore, when the air/fuel ratio is controlled as in the cases of automobiles, there is a fear that $H_2S$ is emitted in stoichiometric or reducing atmospheres. These patent documents do not refer to the catalytic effects in the stoichiometric or reducing atmospheres and do not disclose or suggest the use of these catalysts as three-way catalysts, which are also used in the stoichiometric or reducing atmospheres.

DISCLOSURE OF THE INVENTION

Problems to be Dissolved by the Invention

The present invention has been made in view of the above-mentioned problems. It is an object of the present invention to provide an exhaust gas purifying catalyst which can reduce scattering of bismuth and can retain the effect of suppressing $H_2S$ emissions for a long time.

Means for Dissolving the Problems

The present inventor has conceived that scattering of Bi components can be suppressed by employing a Bi—Ti composite oxide at a predetermined ratio in a conventional three-way catalyst.

An exhaust gas purifying catalyst according to the present invention comprises a support substrate, and a catalyst layer formed on the support substrate and including a noble metal, a porous oxide, and a bismuth and titanium composite oxide, and the ratio R of the molar amount of bismuth loaded per unit volume of the support substrate to the molar amount of titanium loaded per unit volume of the support substrate satisfies $0.3 \leq R \leq 1.5$.

It is preferable that the molar amount of bismuth loaded per unit volume of the support substrate is not less than 0.2 mol/liter and not more than 0.5 mol/liter.

Advantages of the Invention

According to the exhaust gas purifying catalyst of the present invention, scattering of bismuth contained in the Bi—Ti composite oxide can be suppressed by satisfying $0.3 \leq R \leq 1.5$, where R is the ratio of the molar amount of Bi loaded per unit volume of the support substrate to the molar amount of Ti loaded per unit volume of the support substrate. As a result, the effect of suppressing $H_2S$ emissions of the exhaust gas purifying catalyst can be retained for a long time.

Besides, $H_2S$ emission suppression and bismuth scattering suppression can be realized simultaneously by making the molar amount of Bi per unit volume of the support substrate not less than 0.2 mol/liter and not more than 0.5 mol/liter. As a result, the effect of suppressing $H_2S$ emissions can be retained at a high level for a long time.

BEST MODES FOR CARRYING OUT THE INVENTION

Figure 1:
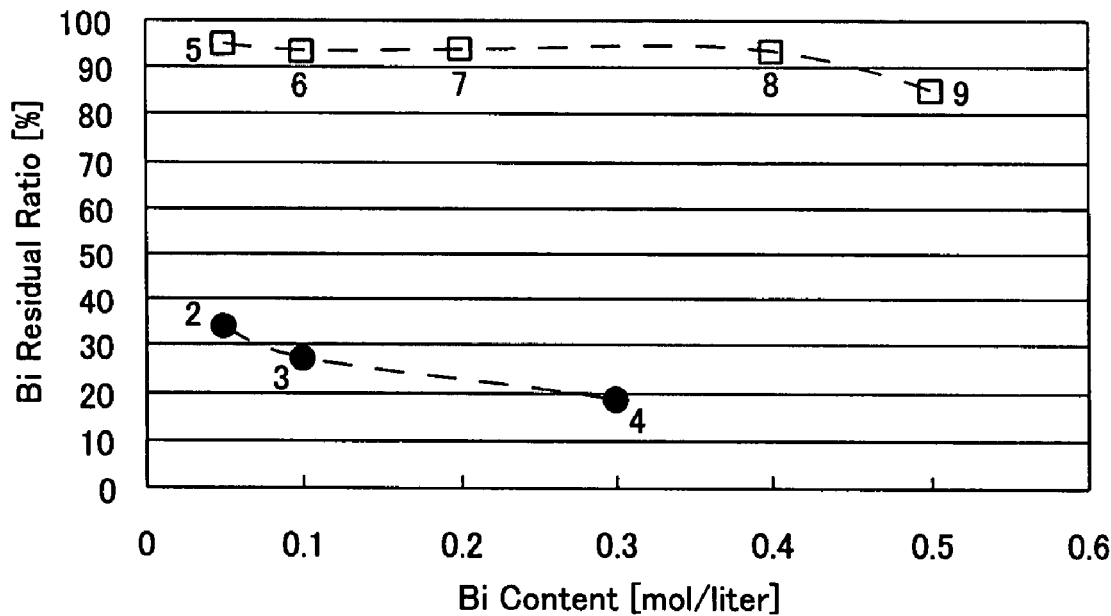
FIG. 1 is a graph showing the Bi residual ratio as a function of the Bi content per unit volume of a support substrate.

The exhaust gas purifying catalyst of the present invention comprises a support substrate and a catalyst layer, and the catalyst layer is formed on the support substrate and includes a noble metal, a porous oxide and a Bi—Ti composite oxide. In other words, the catalyst layer includes a Bi—Ti composite oxide in addition to a conventional three-way catalyst, as mentioned before.

Examples of the porous oxide include alumina, silica, titania, ceria, zirconia, and a composite oxide containing a plurality of these such as a ceria-zirconia solid solution, and one or more of these oxides can be employed. It is preferable to include at least activated alumina, which has a large specific surface area. If an oxide having oxygen storage and release capacity, such as a ceria-zirconia solid solution, is employed, variations in the exhaust gas atmosphere can be restrained and three-way activity is further improved.

It is known that, when a Bi-containing composite oxide is added to a conventional three-way catalyst, the Bi-containing composite oxide can suppress $H_2S$ emissions by oxidizing $SO_2$ into $SO_3$ or $SO_4$ in an oxidizing atmosphere and storing sulfur components as sulfides in a reducing atmosphere. As mentioned before, however, bismuth components scatter at elevated temperatures. The present inventor has found that scattering of bismuth can be suppressed by employing a composite oxide of bismuth and another element which forms a compound with bismuth, and that a significant advantage is obtained especially when titanium is used as another element which forms a compound with bismuth.

The Bi—Ti composite oxide is an oxide mainly containing both a Bi ion and a Ti ion, but may include other metals such as tin (Sn) and zinc (Zn). When the ratio R of the molar amount of Bi loaded per unit volume of the support substrate to the molar amount of Ti loaded per unit volume of the support substrate (hereinafter simply referred to as "R") satisfies $0.3 \leq R \leq 1.5$, scattering of bismuth, which tends to occur during the use at elevated temperatures, can be suppressed effectively. Therefore, the effect of suppressing $H_2S$ emissions can be retained for a long time. In contrast, when R is outside the above range, the effect of suppressing bismuth from scattering deteriorates drastically and, as a result, the effect of suppressing $H_2S$ emissions deteriorates by a long-term use. When R satisfies $0.5 \leq R \leq 1.3$, scattering of bismuth can be suppressed more effectively.

Moreover, as for the Bi content, it is preferable that the molar amount of Bi loaded per unit volume of the support substrate is not less than 0.2 mol/liter and not more than 0.5 mol/liter. When the molar amount of Bi is in this range, $H_2S$ emissions can be effectively suppressed. Therefore, $H_2S$ emission suppression and bismuth scattering suppression can be realized simultaneously, and the effect of suppressing $H_2S$ emissions can be retained at a high level for a long time.

It is more preferable that the molar amount of Bi loaded per unit volume of the support substrate is not less than 0.2 mol/liter and not more than 0.4 mol/liter. When the molar amount of Bi loaded is in this range, $H_2S$ emissions can be suppressed while retaining the three-way activity of a conventional three-way catalyst.

The Bi—Ti composite oxide can be physically mixed with the porous oxide, but can also be added by a sol-gel coprecipitation process or the like. For example, a Bi—Ti composite oxide can be obtained by separating precipitate from an aqueous solution of such a water-soluble chemical compound as a nitrate including at least bismuth and titanium, loading the precipitate on alumina powder or the like and then calcining the resultant.

The noble metal used here catalyzes the oxidation of HC and CO or the reduction of $NO_x$, and suitable examples of the noble metal include platinum (Pt), rhodium (Rh) and palladium (Pd). It is also preferable to use platinum, which shows strong oxidizing activity, and rhodium, which shows strong reducing activity, in combination. Although some of the noble metal can be loaded on the Bi—Ti composite oxide, most of the noble metal is desirably loaded on the porous oxide.

The noble metal loading can be at the same level as in conventional three-way catalysts and can be appropriately determined in accordance with desired performance. The preferred noble metal loading depends on the kinds of noble metals, but is 0.1 to 10 g per liter of the catalyst layer.

The exhaust gas purifying catalyst of the present invention comprises a support substrate on which a catalyst layer is formed. The support substrate employed can be a conventional substrate such as ceramic and metal honeycomb structure. Formation of the catalyst layer on the support substrate can be carried out, for example, by wash coating a slurry including a porous oxide and a Bi—Ti composite oxide on a honeycomb structure, calcining the coated structure so as to form a coating layer, and loading a noble metal on the coating layer by adsorption (wet impregnation) or water absorption (incipient wetness impregnation).

It is also possible to prepare catalyst powder formed by loading a noble metal on a porous oxide beforehand, mix a Bi—Ti composite oxide with this catalyst powder and form a coating layer with the mixture.

It is to be noted that the exhaust gas purifying catalyst of the present invention is not limited to the above modes of carrying out the present invention. For example, if required, another substance can be added in order to add another function to the catalyst layer, as long as no damage is given to the advantages of the exhaust gas purifying catalyst of the present invention.

Preferred Embodiments

Hereinafter, examples of the exhaust gas purifying catalyst of the present invention will be described concretely with comparative examples.

<Formation of Exhaust Gas Purifying Catalysts>

Exhaust gas purifying catalyst samples 1 to 15 were formed by the following procedures.

[Sample 1]

Preparation of a Slurry

A slurry S was prepared by mixing 75 parts by weight of a Ce—Zr solid solution (the molar ratio of $CeO_2:ZrO_2:Y_2O_3=65:30:5$), 12.0 parts by weight of activated alumina, an alumina binder (3 parts by weight of alumina hydrate, 44 parts by weight of a 40% aluminium nitrate aqueous solution) and a predetermined amount of pure water and milling the mixture.

Formation of a Catalyst Coating Layer

A honeycomb substrate having a cell density of 400 cpsi (cells per square inch), a wall thickness of 100 μm, a diameter of 103 mm, a length of 130 mm, and a volume of 1.1 liter was prepared and wash coated with the slurry S. The coated substrate was dried at 120° C. and then calcined at 650° C. for three hours, thereby forming a catalyst coating layer.

Next, the substrate having the catalyst coating layer was immersed in an aqueous rhodium nitrate solution of a predetermined concentration so as to adsorb and load rhodium. After removed from the solution, the piece was dried at 120° C. and then calcined at 500° C. for one hour, thereby loading rhodium. Moreover, the piece was immersed in a platinum dinitrodiammine solution of a predetermined concentration so as to adsorb and load platinum. After removed from the solution, the piece was dried at 120° C. and then calcined at 500° C. for one hour, thereby loading platinum. The noble metal loading was 0.2 g rhodium and 1.0 g platinum per liter of the substrate.

[Sample 2]

Sample 2 was prepared in a similar way to Sample 1, except that 23 parts by weight of bismuth oxide was added to the slurry S.

[Sample 3]

Sample 3 was prepared in a similar way to Sample 1, except that 46 parts by weight of bismuth oxide was added to the slurry S.

[Sample 4]

Sample 4 was prepared in a similar way to Sample 1, except that 69 parts by weight of bismuth oxide was added to the slurry S.

[Sample 5]

Bi—Ti composite oxide powder was prepared by impregnation of anatase titania powder with an aqueous bismuth nitrate solution so as to contain bismuth nitrate at the molar ratio R of Bi to Ti=1, drying and then calcining the resultant at 600° C. for two hours. Sample 5 was prepared in a similar way to Sample 1, except that 27 parts by weight of this Bi—Ti composite oxide powder (27 parts by weight of the total of bismuth oxide and titanium oxide; the same applies to the following) was added to the slurry S.

[Sample 6]

Sample 6 was prepared in a similar way to Sample 1, except that 54 parts by weight of the Bi—Ti composite oxide powder was added to the slurry S.

[Sample 7]

Sample 7 was prepared in a similar way to Sample 1, except that 108 parts by weight of the Bi—Ti composite oxide powder was added to the slurry S.

[Sample 8]

Sample 8 was prepared in a similar way to Sample 1, except that 216 parts by weight of the Bi—Ti composite oxide powder was added to the slurry S.

[Sample 9]

Sample 9 was prepared in a similar way to Sample 1, except that 270 parts by weight of the Bi—Ti composite oxide powder was added to the slurry S.

[Sample 10]

Bi—Ti composite oxide powder was prepared by impregnation of anatase titania powder with an aqueous bismuth nitrate solution so as to contain bismuth nitrate at the molar ratio R of Bi to Ti=4, drying and then calcining the resultant at 600° C. for two hours. Sample 10 was prepared in a similar way to Sample 1, except that 96 parts by weight of this Bi—Ti composite oxide powder was added to the slurry S.

[Sample 11]

Bi—Ti composite oxide powder was prepared by impregnation of anatase titania powder with an aqueous bismuth nitrate solution so as to contain bismuth nitrate at the molar ratio R of Bi to Ti=2, and drying and then calcining the resultant at 600° C. for two hours. Sample 11 was prepared in a similar way to Sample 1, except that 100 parts by weight of this Bi—Ti composite oxide powder was added to the slurry S.

[Sample 12]

Bi—Ti composite oxide powder was prepared by impregnation of anatase titania powder with an aqueous bismuth nitrate solution so as to contain bismuth nitrate at the molar ratio R of Bi to Ti=1.33, drying and then calcining the resultant at 600° C. for two hours. Sample 12 was prepared in a similar way to Sample 1, except that 104 parts by weight of this Bi—Ti composite oxide powder was added to the slurry S.

[Sample 13]

Bi—Ti composite oxide powder was prepared by impregnation of anatase titania powder with an aqueous bismuth nitrate solution so as to contain bismuth nitrate at the molar ratio R of Bi to Ti=1, drying and then calcining the resultant at 600° C. for two hours. Sample 13 was prepared in a similar way to Sample 1, except that 108 parts by weight of this Bi—Ti composite oxide powder was added to the slurry S.

[Sample 14]

Bi—Ti composite oxide powder was prepared by impregnation of anatase titania powder with an aqueous bismuth nitrate solution so as to contain bismuth nitrate at the molar ratio R of Bi to Ti=0.5, drying and then calcining the resultant at 600° C. for two hours. Sample 14 was prepared in a similar way to Sample 1, except that 132 parts by weight of this Bi—Ti composite oxide powder was added to the slurry S.

[Sample 15]

Bi—Ti composite oxide powder was prepared by impregnation of anatase titania powder with an aqueous bismuth nitrate solution so as to contain bismuth nitrate at the molar ratio R of Bi to Ti=0.33, drying and then calcining the resultant at 600° C. for two hours. Sample 15 was prepared in a similar way to Sample 1, except that 140 parts by weight of this Bi—Ti composite oxide powder was added to the slurry S.

The Bi content, the Ti content and the Bi/Ti ratio R of each sample are shown in Table 1.

TABLE 1

| | Bi Content (mol/liter) | Ti Content (mol/liter) | Bi/Ti Ratio | $H_2S$ Emission (ppm) | Bi Residual Ratio (%) | $CO-NO_x$ Cross Conversion (%) |
|---|---|---|---|---|---|---|
| Sample 1 | 0 | 0 | — | 300 | — | 96.7 |
| Sample 2 | 0.05 | 0 | — | 25 | 34 | 96.4 |
| Sample 3 | 0.1 | 0 | — | 15 | 27 | 94.7 |
| Sample 4 | 0.3 | 0 | — | 8 | 18 | 91.0 |
| Sample 5 | 0.05 | 0.05 | 1 | 54 | 95 | 96.5 |
| Sample 6 | 0.1 | 0.1 | 1 | 36 | 93 | 95.7 |
| Sample 7 | 0.2 | 0.2 | 1 | 24 | 94 | 95.0 |
| Sample 8 | 0.4 | 0.4 | 1 | 21 | 93 | 93.7 |
| Sample 9 | 0.5 | 0.5 | 1 | 19 | 85 | 93.0 |
| Sample 10 | 0.2 | 0.05 | 4 | 21 | 22 | — |
| Sample 11 | 0.2 | 0.1 | 2 | 20 | 23 | — |
| Sample 12 | 0.2 | 0.15 | 1.33 | 24 | 78 | — |
| Sample 13 | 0.2 | 0.2 | 1 | 23 | 95 | — |
| Sample 14 | 0.2 | 0.4 | 0.5 | 26 | 90 | — |
| Sample 15 | 0.2 | 0.6 | 0.33 | 25 | 60 | — |

<Examination and Evaluation>

[Bi Scattering Test]

Each of the above Samples 1 to 15 was disposed in an exhaust line of an engine bench equipped with a 4.3-liter V-type 8-cylinder engine and aged at a catalyst bed temperature of 850° C. for 50 hours at an air/fuel ratio frequency of 1 Hz between A/F=15 and A/F=14. After this aging, each of the samples was dismantled and subjected to elemental analysis of the Bi content, and the Bi contents were compared between before and after aging. The ratio of the Bi content after aging to that before aging is shown as "Bi residual ratio" in Table 1, FIGS. 1 and 2, in which the numerals indicate sample numbers.

[$H_2S$ Emission Test]

Each of the abovementioned Samples 1 to 15 was installed as an underfloor catalyst in an automobile equipped with a 2.4-liter inline 4-cylinder engine and a test run was carried out for one hour while keeping combustion and driving modes at a running speed of 40 km/hr so as to have an underfloor catalyst bed temperature of 600 to 650° C. Next, with the throttle fully open, the automobile was accelerated up to a speed of 110 km/hr in ten seconds, kept at this speed for ten seconds, and then decelerated and stopped in twenty seconds and kept idling for ten seconds from the stop.

Figure 3:
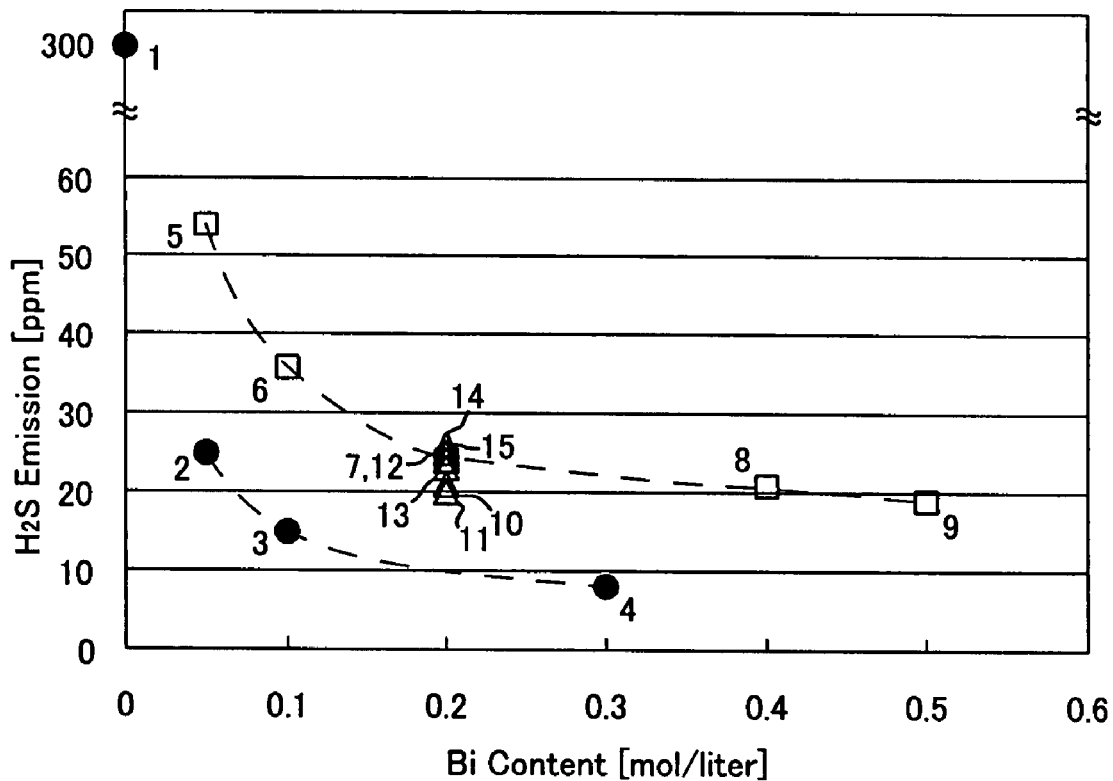
FIG. 3 is a graph showing $H_2S$ emissions as a function of the Bi content per unit volume of a substrate.

The $H_2S$ concentration in the exhaust gas during idling was measured and its peak concentration is shown in Table 1 and FIG. 3, in which the numerals indicate sample numbers.

[Conversion Efficiency Tests]

Figure 4:
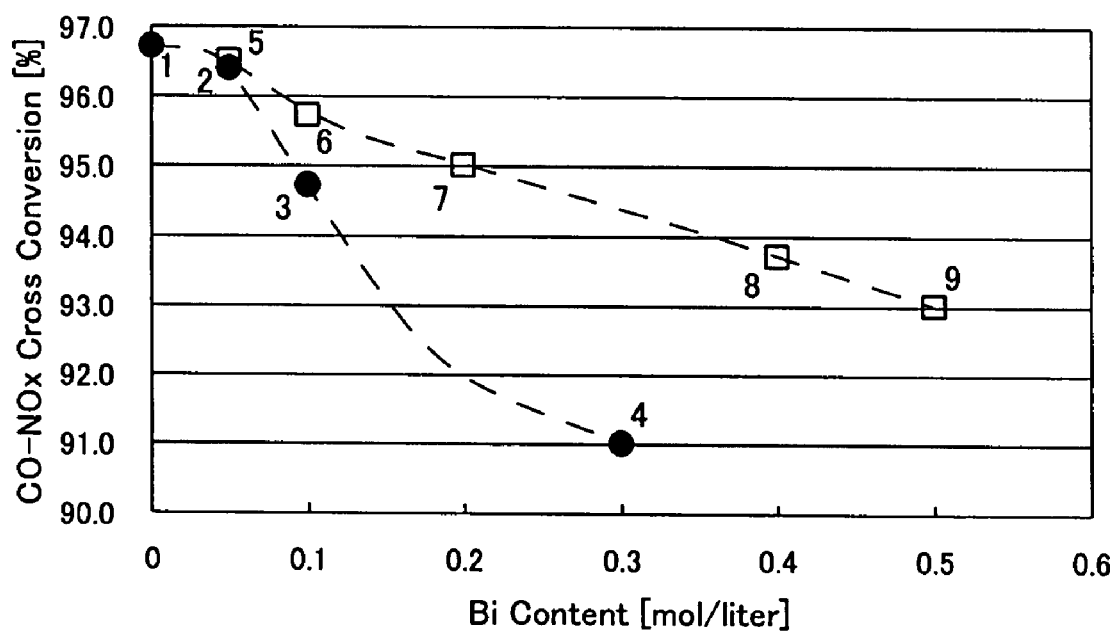
FIG. 4 is a graph showing CO—$NO_x$ cross conversion efficiency as a function of the Bi content per unit volume of a substrate.

Each of the above Samples 1 to 9 was aged in the same way as in the above Bi scattering test. After this aging, each of the above Samples 1 to 9 was disposed as an underfloor catalyst in an automobile equipped with a 2.4-liter inline 4-cylinder engine, and while combustion conditions were varied to sweep the air/fuel ratio between A/F=13.5 and A/F=15.5, inlet and outlet catalyst exhaust gas conversion efficiencies of CO and $NO_x$ were measured. The inlet exhaust gas temperature of the sample catalysts was 400° C. The conversion efficiency at the cross point of the CO conversion curve and the $NO_x$ conversion curve is called as "CO—$NO_x$ cross conversion". The CO—$NO_x$ cross conversion is shown in Table 1 and FIG. 4, in which the numerals indicate sample numbers.

[Evaluation]

Figure 2:
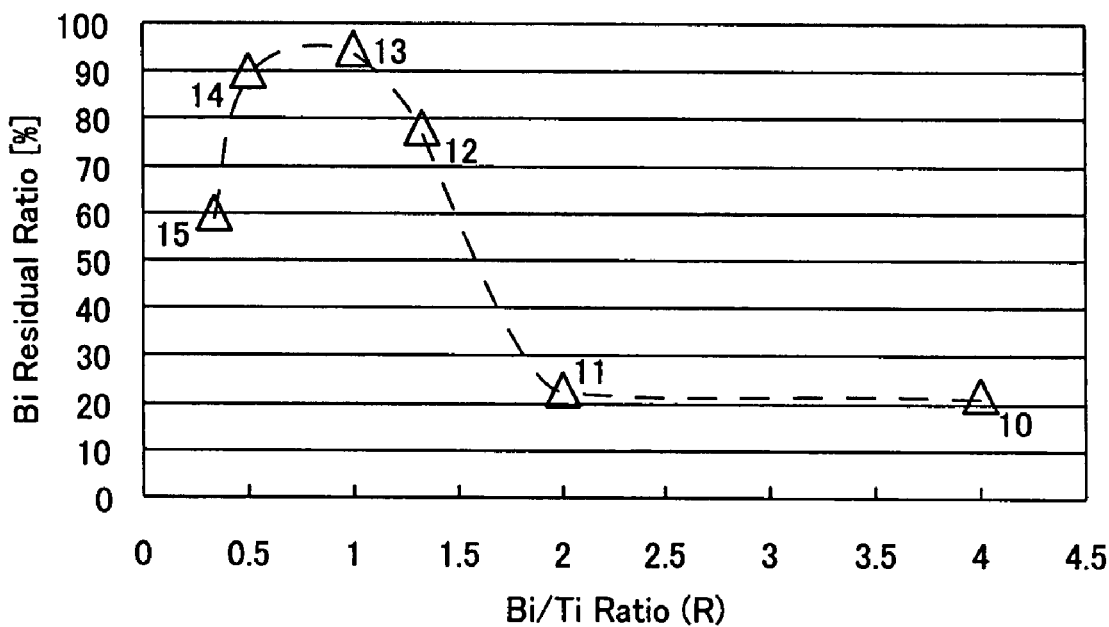
FIG. 2 is a graph showing the Bi residual ratio as a function of the Bi/Ti ratio, that is, the ratio R of the molar amount of Bi loaded per unit volume of a support substrate to the molar amount of Ti loaded per unit volume of the support substrate.

It is apparent from the graph of FIG. 1 that the composite oxide containing both Ti and Bi exhibits a higher Bi residual ratio after aging than the Ti-free composite oxide. It is also apparent from the graph of FIG. 2 that Samples 12 to 15, in which the Bi/Ti ratio R satisfies $0.3 \leq R \leq 1.5$, are excellent in the effect of suppressing Bi from scattering. Especially, the catalysts in which the ratio R satisfies $0.5 \leq R \leq 1.3$ are more excellent in the effect of suppressing Bi from scattering.

As seen from the graph of FIG. 3, when the Bi content is not less than 0.2 mol/liter and not more than 0.5 mol/liter, the effect of suppressing $H_2S$ emissions is high. Moreover, as seen from the graph of FIG. 4, when the Bi content is not less than 0.2 mol/liter and not more than 0.4 mol/liter, $H_2S$ emissions can be suppressed while retaining three-way activity.

While preferred embodiments have been shown and described, various modifications and substitutions may be made thereto without departing from the spirit and scope of the invention.

Accordingly, it is to be understood that the present invention has been described by way of illustration only, and such illustrations and embodiments as have been disclosed herein are not to be construed as limiting to the claims.

INDUSTRIAL APPLICABILITY

The exhaust gas purifying catalyst of the present invention is useful as a three-way catalyst for automobile engines. The application, however, is not limited to automobile engines and can be used for other internal combustion engines where combustion is controlled at or near the stoichiometric atmosphere.

The invention claimed is:

1. An exhaust gas purifying catalyst, comprising:
   a support substrate; and
   a catalyst layer formed on said support substrate and including a noble metal, a porous oxide, and a bismuth and titanium composite oxide,
   the ratio R of the molar amount of bismuth loaded per unit volume of said support substrate to the molar amount of titanium loaded per unit volume of said support substrate satisfying $0.3 \leq R \leq 1.5$.

2. The exhaust gas purifying catalyst according to claim 1, wherein the ratio R of the molar amount of bismuth loaded per unit volume of said support substrate to the molar amount of titanium loaded per unit volume of said support substrate satisfies $0.5 \leq R \leq 1.3$.

3. The exhaust gas purifying catalyst according to claim 1 or 2, wherein the molar amount of bismuth loaded per unit volume of said support substrate is not less than 0.2 mol/liter and not more than 0.5 mol/liter.

4. The exhaust gas purifying catalyst according to claim 1 or 2, wherein the molar amount of bismuth loaded per unit volume of said support substrate is not less than 0.2 mol/liter and not more than 0.4 mol/liter.

* * * * *